United States Patent
Fischer et al.

(10) Patent No.: US 6,305,413 B1
(45) Date of Patent: Oct. 23, 2001

(54) MIXING ADAPTOR SYSTEM

(75) Inventors: Dan E. Fischer; Robert Larsen, both of Sandy, UT (US)

(73) Assignee: Ultradent Products, Inc., South Jordan, UT (US)

( * ) Notice: Subject to any disclaimer, the term of this patent is extended or adjusted under 35 U.S.C. 154(b) by 0 days.

(21) Appl. No.: 09/638,750

(22) Filed: Aug. 14, 2000

Related U.S. Application Data

(63) Continuation of application No. 09/251,887, filed on Feb. 19, 1999, now Pat. No. 6,234,196.

(51) Int. Cl.⁷ .............................. F16K 17/18; B01F 13/00
(52) U.S. Cl. .................................... 137/493.8; 137/512.4; 366/130
(58) Field of Search .................................... 366/130, 267, 366/268; 137/493.8, 512.4

(56) References Cited

U.S. PATENT DOCUMENTS

| | | | |
|---|---|---|---|
| 3,010,705 | * 11/1961 | Brown | 366/268 |
| 3,729,031 | 4/1973 | Baldwin | 141/2 |
| 3,860,218 | * 1/1975 | Hurlimann | 366/268 |
| 4,046,145 | 9/1977 | Choksi et al. | 128/215 |
| 4,440,308 | 4/1984 | Baker | 220/204 |
| 4,463,875 | 8/1984 | Tepic | 222/82 |
| 4,743,229 | 5/1988 | Chu | 604/82 |
| 5,159,953 | 11/1992 | Sato et al. | 137/527.8 |
| 5,425,580 | 6/1995 | Beller | 366/131 |
| 5,477,829 | 12/1995 | Hassinger et al. | 123/467 |
| 5,643,206 | 7/1997 | Fischer | 604/82 |
| 5,725,499 | 3/1998 | Silverstein et al. | 604/82 |
| 5,908,054 | 6/1999 | Safabash et al. | 141/26 |
| 6,062,722 | * 5/2000 | Lake | 366/130 |

FOREIGN PATENT DOCUMENTS 1138557  12/1955  (FR) .................................. 137/493.8

* cited by examiner

*Primary Examiner*—Stephen M. Hepperle
(74) *Attorney, Agent, or Firm*—Workman, Nydegger & Seeley

(57) ABSTRACT

A mixing adaptor enables a material to be transferred from a first delivery means to a second delivery means and enables another material to be transferred from the second delivery means to the first delivery means. The adaptor has (i) a hollow main body having a first end, a second end, an interior surface and an exterior surface; and (ii) a septum positioned within the interior surface of the main body. A first channel is defined by a first portion of the interior surface of the main body and by a first side of the septum. The first channel has a primary opening at the first end of the main body and a secondary opening at the second end of the main body. A second channel is defined by a second portion of the interior surface of the main body and by a second side of the septum. The second channel has a primary opening at the second end of the main body and a secondary opening at the first end of the main body. First and second substantially flexible members extend from opposing sides of the septum for selectively closing the secondary openings of the first and second channels. In one embodiment, the septum is movable between a first position and a second position.

22 Claims, 11 Drawing Sheets

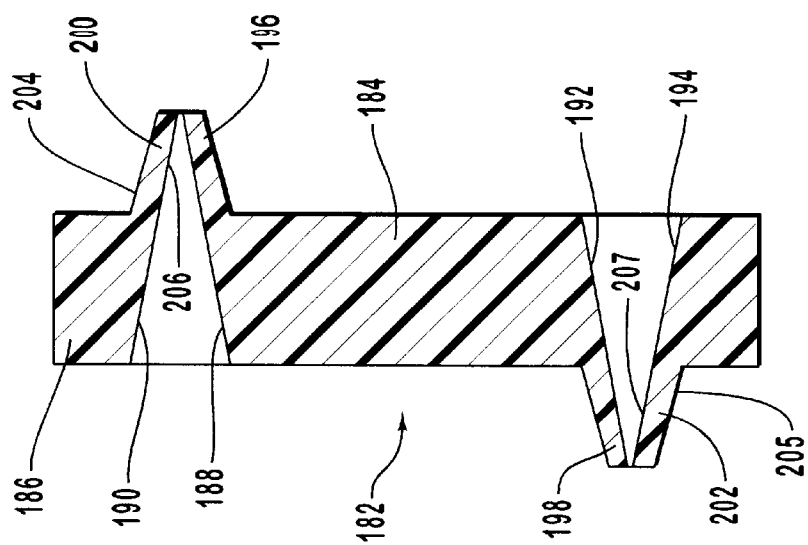
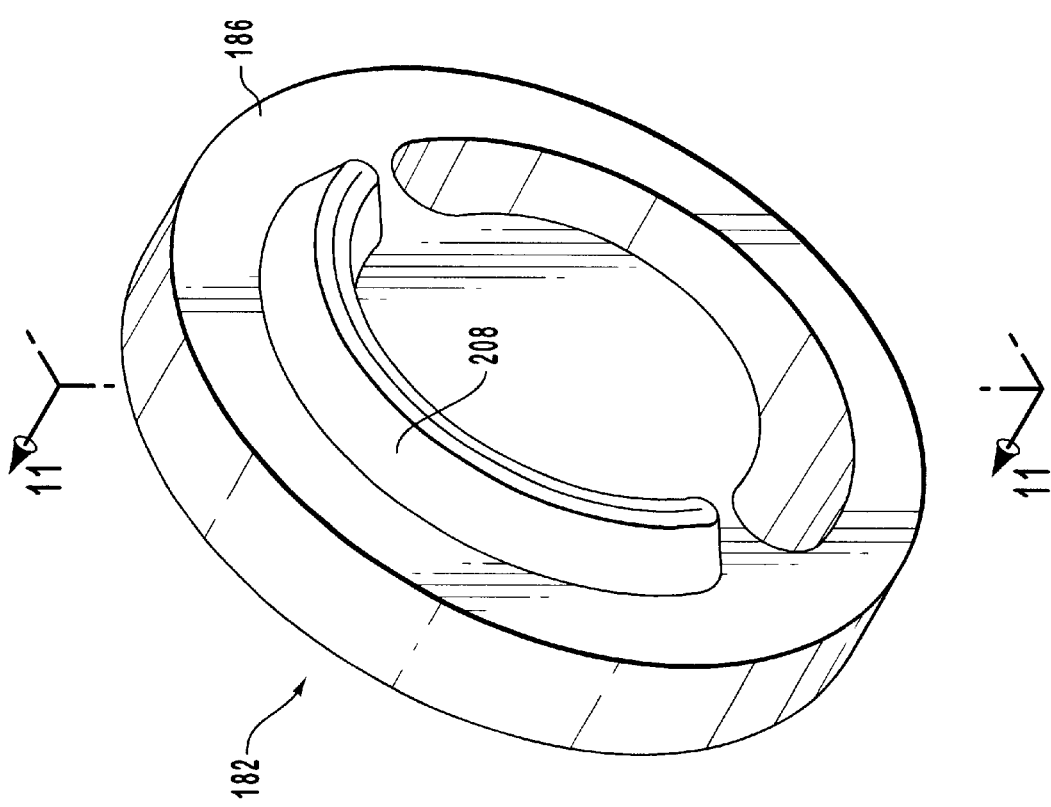
FIG. 11
FIG. 10

MIXING ADAPTOR SYSTEM

This application is a continuation patent application of U.S. patent application Ser. No. 09/251,887 now U.S. Pat. No. 6,234,196 entitled MIXING ADAPTOR AND SYSTEM, which was filed on Feb. 19, 1999 on behalf of Dan E. Fischer and Robert Larsen. Ser. No. 09/251,887 is incorporated herein by specific reference.

BACKGROUND OF THE INVENTION

1. The Field of the Invention

This invention is in the field of methods and devices for mixing and dispensing compositions. More particularly, this application is directed to methods and devices for mixing and dispensing multi-part medical and dental compositions.

2. Related Applications

Adaptors have been employed in the art in order to couple one syringe in fluid communication with another syringe. Such adaptors are typically configured to be positioned between the syringes by coupling one portion of the adaptor to one syringe and another portion of the adaptor to another syringe. Typical adaptors have a passageway therethrough in order to enable material in one syringe to pass through the passageway of the adaptor to the opposing syringe. After coupling the adaptor between opposing syringes, material from one syringe may be delivered through the adaptor into another syringe.

A variety of different uses for such so-called "syringe-to-syringe adaptors" are available. For example, syringe-to-syringe adaptors may be useful for connecting a large reservoir syringe to the small dose syringe so that the material stored in the large reservoir syringe may be transferred to a small dose syringe. Syringe-to-syringe adaptors may also be used for back-filling a syringe or for combining materials in different syringes to form a mixture.

First and second syringes may also be coupled directly together without the use of an adaptor therebetween in order to combine materials disposed within the syringes. The plungers of the syringes are alternatively compressed or actuated in cycles until the materials within the syringes mix.

There are many advantages to typical syringe-to-syringe mixing applications, both with respect to applications involving syringes which directly couple in order to combine material and with respect to syringes which couple through the use of an adaptor. However, each of such typical syringe-to-syringe mixing applications feature a single, linear pathway which extends from one syringe to another or from one end of an adaptor to an opposing end of the adaptor.

Consequently, material in the distal tip portion of a first syringe is delivered in a substantially linear manner through the linear pathway to the distal tip portion of a second syringe. If the plunger of the second syringe is then pressed, substantially the same material delivered to the tip of the second syringe is delivered back along the same linear pathway in an opposite direction. As a result, substantially the same material originally delivered from the distal tip of the first syringe is returned back to the distal tip of the first syringe.

Thus, material located remotely from the tips can remain in such a remote position and fail to mix. Instead, substantially the same material is pushed back and forth along the linear pathway between the tips of the syringes. Overall, this phenomenon can result in inadequate mixing of the components from one syringe to another or can require long mixing times in order to mix the components.

SUMMARY AND OBJECTS OF THE INVENTION

It is therefore an object of the invention to provide an improved adaptor and system for enabling a material to be transferred from a first delivery means for delivering material to a second delivery means for delivering material and for enabling another material to be transferred from the second delivery means to the first delivery means.

It is another object of the invention to provide an improved adaptor and system for coupling opposing delivery means with each other such that the materials within the delivery means can be thoroughly mixed.

It is another object of the invention to provide an improved adaptor which enables material in opposing delivery means to circulate in a non-linear flow pattern between the delivery means.

It is another object of the invention to provide an adaptor for coupling delivery means which has an asymmetric flow path.

It is another object of the invention to provide an adaptor for coupling sources of material which has a selectively openable flow channel.

It is another object of the invention to provide a system for mixing materials comprising an adaptor and mating delivery means which conveniently couple with the adaptor.

The present invention relates to an adaptor for enabling a material to be transferred from a first delivery means for delivering material to a second delivery means for delivering material and for enabling a material to be transferred from the second delivery means to the first delivery means. The adaptor comprises: (i) a hollow main body having a first end, a second end, an interior surface and an exterior surface; and (ii) a septum positioned within the interior surface of the main body.

A first portion of the interior surface of the main body and a first side of the septum define a first channel within the main body. The first channel extends from the first end of the main body to the second end of the main body and has a primary opening at the first end and a secondary opening at the second end of the main boy. A second portion of the interior surface of the main body and a second side of the septum define a second channel within the main body. The second channel extends from the second end of the main body to the first end of the main body and has a primary opening at the second end and a secondary opening at the first end of the main body.

A first flow path flows from the first delivery means through the first channel to the second delivery means. A second flow path flows from the second delivery means through the second channel to the first delivery means.

In order to selectively close the first and second channels, a valve is disposed at the end of each channel. Each valve includes a valve seat and a valve head. In one embodiment, each valve seat is an edge of the main body and each valve head is a substantially flexible member extending from an opposing end of the septum.

The first substantially flexible member can be configured to selectively close the secondary opening of the first channel when the member is positioned against the second end of the main body. The second substantially flexible member can be configured to selectively close the secondary opening of the second channel when the member is positioned against the first end of the main body.

In order to mix material in different syringes or other delivery means, the practitioner can deliver material back and forth between the delivery means until the material is adequately mixed. In light of the first and second channels of the adaptor of the present invention, a substantially circular, asymmetric, non-linear flow pattern can be achieved when material is alternately delivered from a first delivery means to a second delivery means. This allows convenient mixing of a first material in the first delivery means and a second material in the second delivery means. This is particularly useful for two-part type dental and medical compositions, such as epoxies, but is useful in a variety of different applications in which mixing is desired.

In light of the bidirectional nature of the first and second channels, the material in the first delivery means flows in a substantially different pathway than material flowing from the second delivery means, and vice versa, creating the substantially circular flow pattern. Material expressed from each channel preferably exits outwardly into a side portion of a given delivery means. This assists in circulating material from substantially different portions of the first and second delivery means.

Also because of the side or outward exiting nature of the material, the flow path of material is asymmetric and turbulent. The asymmetric, turbulent flow enhances the mixing of the material. Since the flow pattern is asymmetric and substantially circular, the material is mixed in a quicker and more efficient manner.

In one adaptor embodiment, the septum is substantially nonmovably affixed within the hollow main body. In another adaptor embodiment, the septum is movably affixed within the hollow main body and moves between a first position and a second position as material is input from opposing sides of the adaptor.

The adaptor is configured for coupling between first and second delivery means, such as syringes. The adaptor may be formed substantially as a cylinder, a disk, or a variety of different configurations. In one presently preferred embodiment, a first syringe is configured to be selectively placed about a portion of the adaptor and a second syringe is configured to be selectively placed about the tip of the first syringe. In another embodiment, syringes are selectively coupled to opposing ends of the adaptor. A variety of other coupling configurations are available as well. A system of the present invention thus comprises an adaptor and first and second syringes or other delivery means configured to be coupled to the adaptor.

These and other objects and features of the present invention will become more fully apparent from the following description and appended claims, or may be learned by the practice of the invention as set forth hereinafter.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not therefore to be considered to be limiting of its scope, the invention will be described and explained with additional specificity and detail through the use of the accompanying drawings in which:

FIG. 10 is a perspective view of another adaptor of the present invention.

FIG. 11 is a cross sectional view of the adaptor of FIG. 10.

DETAILED DESCRIPTION OF THE PREFERRED EMBODIMENTS

Figure 1:
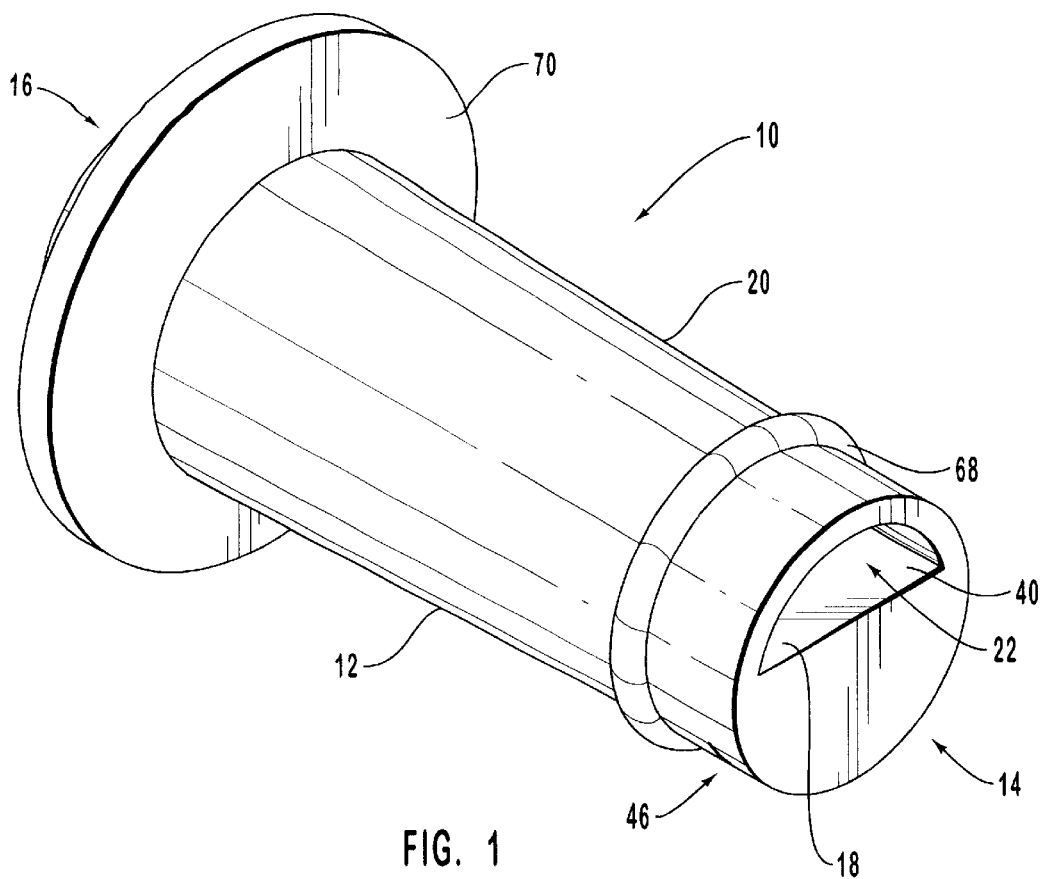
FIG. 1 is a perspective view of an adaptor of the present invention.
Figure 2:
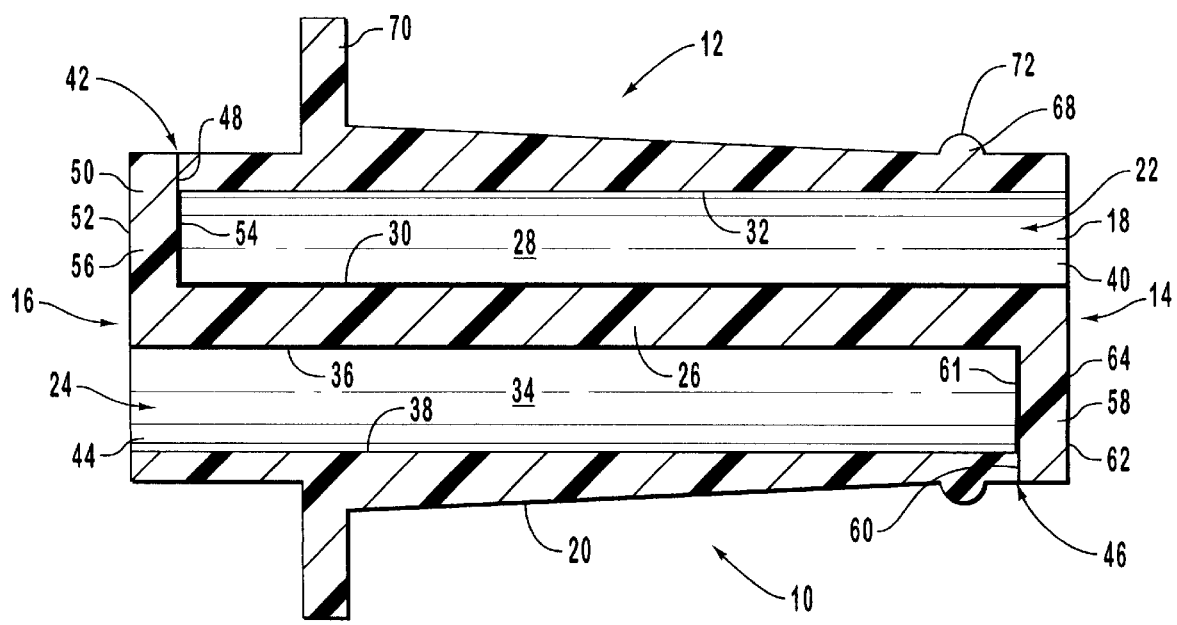
FIG. 2 is a view of the adaptor of FIG. 1 taken in longitudinal cross section.

With reference now to FIGS. 1 and 2, an example of an adaptor 10 of the present invention is shown. Adaptor 10 is configured for enabling a material to be transferred from a first delivery means for delivering material to a second delivery means for delivering material and for enabling another material to be transferred from the second delivery means to the first delivery means.

Adaptor 10 has (i) a substantially cylindrical, hollow main body 12 having a first end 14, a second end 16, an interior surface 18, and an exterior surface 20; and (ii) dividing means for dividing main body 12 such that there is a first channel 28 within main body 12, and a second channel 34 within main body 12. First channel 28 extends from first end 14 of the main body 12 to second end 16 of main body 12. Second channel 34 extends from second end 16 of main body 12 to first end 14 of main body 12.

In the embodiment of FIGS. 1 and 2, the dividing means for dividing main body 12 such that there is a first channel 28 and a second channel 34 comprises septum 26 coupled within interior surface 18 of main body 12. Septum 26 of FIG. 2 is substantially immovably fixed within main body 12, whereas in another embodiment discussed below, the septum is configured to move flexibly between a first position and a second position. Septum 26 preferably extends integrally from main body 12.

In the embodiment of FIGS. 1 and 2, channel 28 is defined by a first side 30 of septum 26; and (ii) a first portion 32 of interior surface 18 of main body 12. First channel 28 defines a first flow path 22 flowing through adaptor 10. Also in this embodiment, second channel 34 is defined by (i) an opposing second side 36 of septum 26; and (ii) a second portion 38 of interior surface 18 of main body 12. Second channel 34 defines a second flow path 24 flowing through adaptor 10.

First channel 28 has a primary opening 40 at first end 14 of main body 12 and a secondary opening 42 (shown as being closed in FIG. 2) at second end 16 of main body 12. Second channel 34 has a primary opening 44 at second end 16 of main body 12 and a secondary opening 46 (shown as being closed in FIG. 2) at first end 14 of main body 12.

In the embodiment of FIGS. 1 and 2, secondary openings 42, 46 of first and second channels 28, 34 respectively, are defined by respective slits in main body 12. Such slits may be formed through the use of a razor blade, for example.

Adaptor 10 further comprises valve means for selectively closing secondary opening 42 of first channel 28. In one embodiment, the valve means comprises a valve seat 48 and a valve head 50. Valve seat 48 is preferably an exterior edge of second end 16 of main body 12.

Valve head 50 has an exterior surface 52 and an interior surface 54. Valve head 50 moves away from valve seat 48 when material is delivered from a first delivery means within first channel 28 along first flow path 22 and against interior surface 54 of valve head 50. Valve head 50 thereby opens secondary opening 42 of first channel 28.

Valve head 50 seals against valve seat 48 when material is delivered against an exterior surface 52 of valve head 50, ie., when material is delivered against exterior surface 52 of valve head 50 from a second delivery means. Valve head 50 thereby closes secondary opening 42. Valve head 50 preferably comprises a first substantially flexible member 56 extending integrally and transversely from one end of septum 26 adjacent second end 16 of main body 12.

Adaptor 10 further comprises valve means for selectively closing secondary opening 46 of second channel 34, such as a valve head 58 and seat 60. Valve seat 60 is preferably an exterior edge of first end 14 of main body 12.

Valve head 58 has an interior surface 61 and an exterior surface 62. Valve head 58 moves away from valve seat 60 when material is delivered from a second delivery means within second channel 34 along second flow path 24 and against interior surface 61 of valve head 58. Valve head 58 thereby opens secondary opening 46 of second channel 34.

Valve head 58 seals against valve seat 60 when material is delivered against an exterior surface 62 of valve head 58, i.e., when material is delivered against exterior surface 62 of valve head 58 from a first delivery means. Valve head 58 thereby closes secondary opening 46. Valve head 58 preferably comprises a second substantially flexible member 64 extending integrally and transversely from an end of septum 26 adjacent first end 14 of the main body 12.

Valve heads 50, 58 of FIGS. 1 and 2 may be formed when respective secondary openings 42, 46 are formed. For example, as a razor blade or other tool is employed to form slit-shaped secondary openings 42, 48, respective valve heads 50, 58 remain integrally attached to septum 26. The razor blade forms such a slit by cutting from the exterior surface portion 20 of main body 12 to septum 26 on opposing sides of body 12, for example. In another embodiment (not shown) one or both valve heads are hingedly, pivotally, or rotatably mounted to main body 12 or septum 26, or mounted thereto in another fashion.

Figure 5:
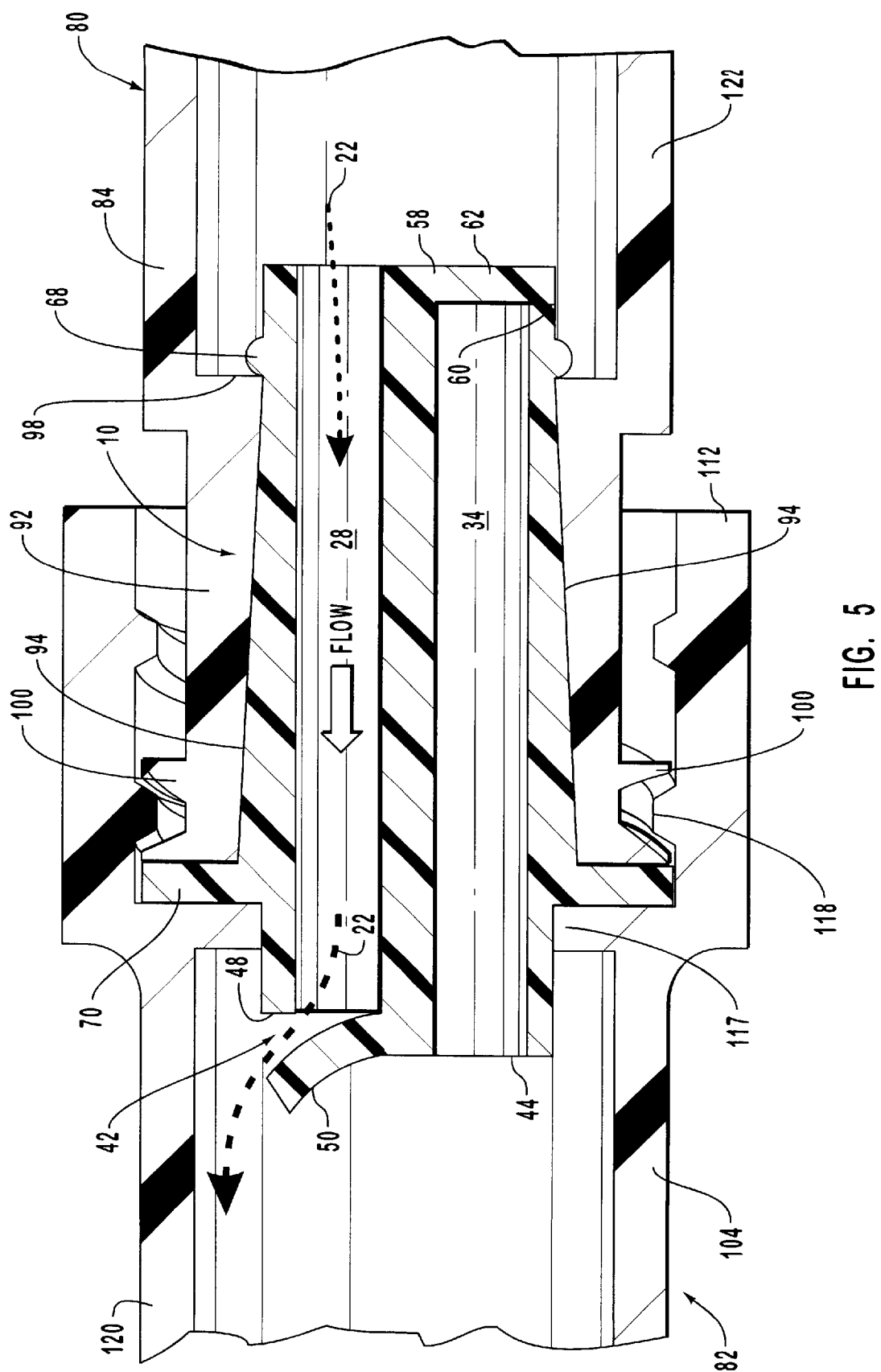
FIG. 5 is a cross sectional view of a system of the present invention comprising the adaptor of FIGS. 1 and 2 and the syringe barrels of FIGS. 3 and 4. A material flows through a first flow path, while a second flow path is closed.

Exterior surface 20 of main body 12 is preferably a tapered, substantially cylindrical surface. Extending from surface 20 in the embodiment of FIGS. 1 and 2 are a first circular flange 68 extending radially outward at first end 14 of main body 12 and a second circular flange 70 extending radially outward at second end 16 of main body 12. In one embodiment, first circular flange 68 has a rounded tip 72. As discussed below, first circular flange 68 increases the ability of the adaptor to securely couple with the first syringe 80 as shown in FIG. 5. As also discussed below, FIG. 5 shows that circular flange 70 assists in restraining the adaptor from further movement once circular flange 70 is engaged against a mated surface of second syringe 82, internal circular shoulder 117.

Figure 3:
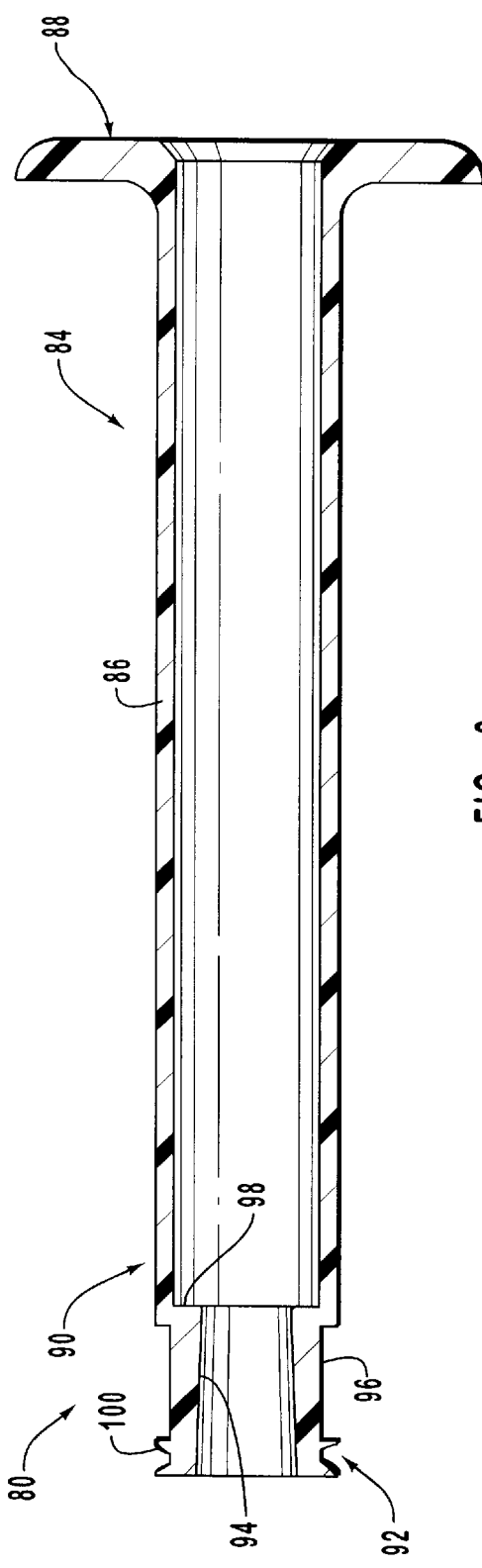
FIG. 3 is a cross-sectional view of a barrel of a first syringe of the present invention.

With reference now to FIGS. 1–4, an example of a system of the present invention comprises (i) a first syringe 80 or other delivery means (FIG. 3); (ii) a second syringe 82 or other delivery means (FIG. 4); and (iii) adaptor 10 (FIGS. 1–2) for selectively coupling first syringe 80 with second syringe 82. Adaptor 10 enables a material to be transferred between first syringe 80 and second syringe 82. Adaptor 10 is selectively coupled to first and second syringes 80, 82.

In the embodiment of FIG. 3, first syringe 80 comprises a syringe barrel 84 and a syringe plunger (not shown in FIG. 3). Syringe barrel 84 has (i) a hollow main body 86 having a proximal end 88 and a distal end 90; and (ii) a hollow tip 92 coupled to and in fluid communication with main body 86.

Tip 92 has an interior surface 94, an exterior surface 96, an internal circular shoulder 98, and male threads 100 extending from exterior surface 96. Shoulder 98 is configured to receive first flange 68 of adaptor 10. Interior surface 94 of tip 92 has a substantially cylindrical, tapered surface configured to mate with substantially cylindrical, tapered exterior surface 20 of main body 12 of adaptor 10.

As can be seen in FIG. 5, upon extending circular flange 68 of adaptor 10 past circular shoulder 98, flange 68 secures behind shoulder 98 and interior surface 94 of tip 92 mates with exterior surface 20 of main body 12 of adaptor 10 between first circular flange 68 and second circular flange 70. In this manner, adaptor 10 is maintained tightly coupled to tip 92 of barrel 84.

Figure 4:
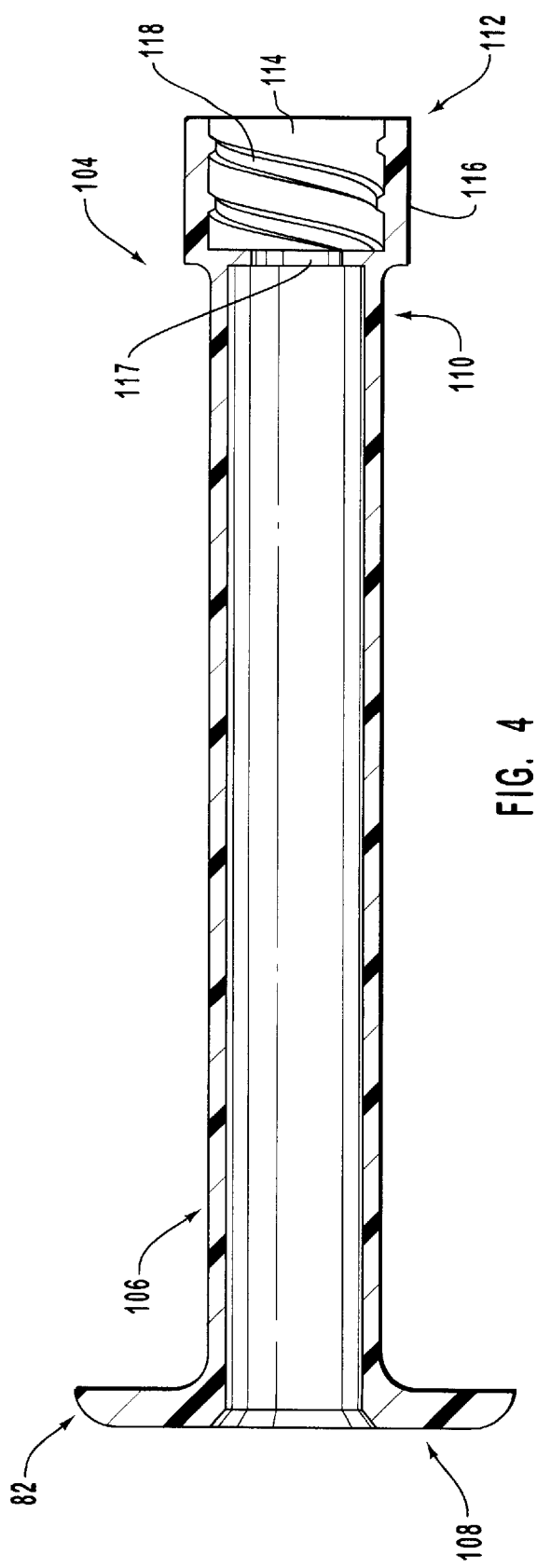
FIG. 4 is a cross-sectional view of a barrel of a second syringe of the present invention.

In the embodiment of FIG. 4, second syringe 82 comprises a syringe barrel 104 and a syringe plunger (not shown in FIG. 4). Syringe barrel 104 has (i) a hollow main body 106 having a proximal end 108 and a distal end 110; and (ii) a hollow tip 112 coupled to and in fluid communication with main body 106.

Tip 112 has an interior surface 114, an exterior surface 116, an internal circular shoulder 117, and female threads 118 extending from exterior surface 114. As indicated above, barrel 104 is configured to receive the second flange 70 of adaptor 10 against shoulder 117. Female threads 118 are configured to selectively mate directly with male threads 100 of first barrel 84.

As can be seen in FIG. 5, upon selectively mounting tip 112 of second barrel 104 on tip 92 of first barrel 84 after adaptor 10 is placed partially within first barrel 84, circular flange 70 of adaptor 10 is maintained tightly between circular shoulder 117 of barrel 104 and tip 92 of first barrel 84. Adaptor 10, first barrel 84 and second barrel 104 are thus in fluid communication. Upon placing material and plungers within respective barrels 84, 104, the material can be readily mixed by pressing against alternating plungers.

With continued reference now to FIG. 5, first flow path 22 is shown. In operation, material delivered from first syringe 80 enters first channel 28 and travels along first flow path 22, exiting at secondary opening 42. As material is delivered along path 22, valve head 50 is opened and unseated from valve seat 48. Flow path 22 extends out of secondary opening 42 past valve head 50 in an outward manner, ie., toward the wall 120 of barrel 104. In the embodiment of FIG. 5, material flows from first syringe 80. Thus, second valve head 58, e.g., member 62 is pressed against second valve seat 60, sealing secondary opening 46 of second channel 34.

Figure 6:
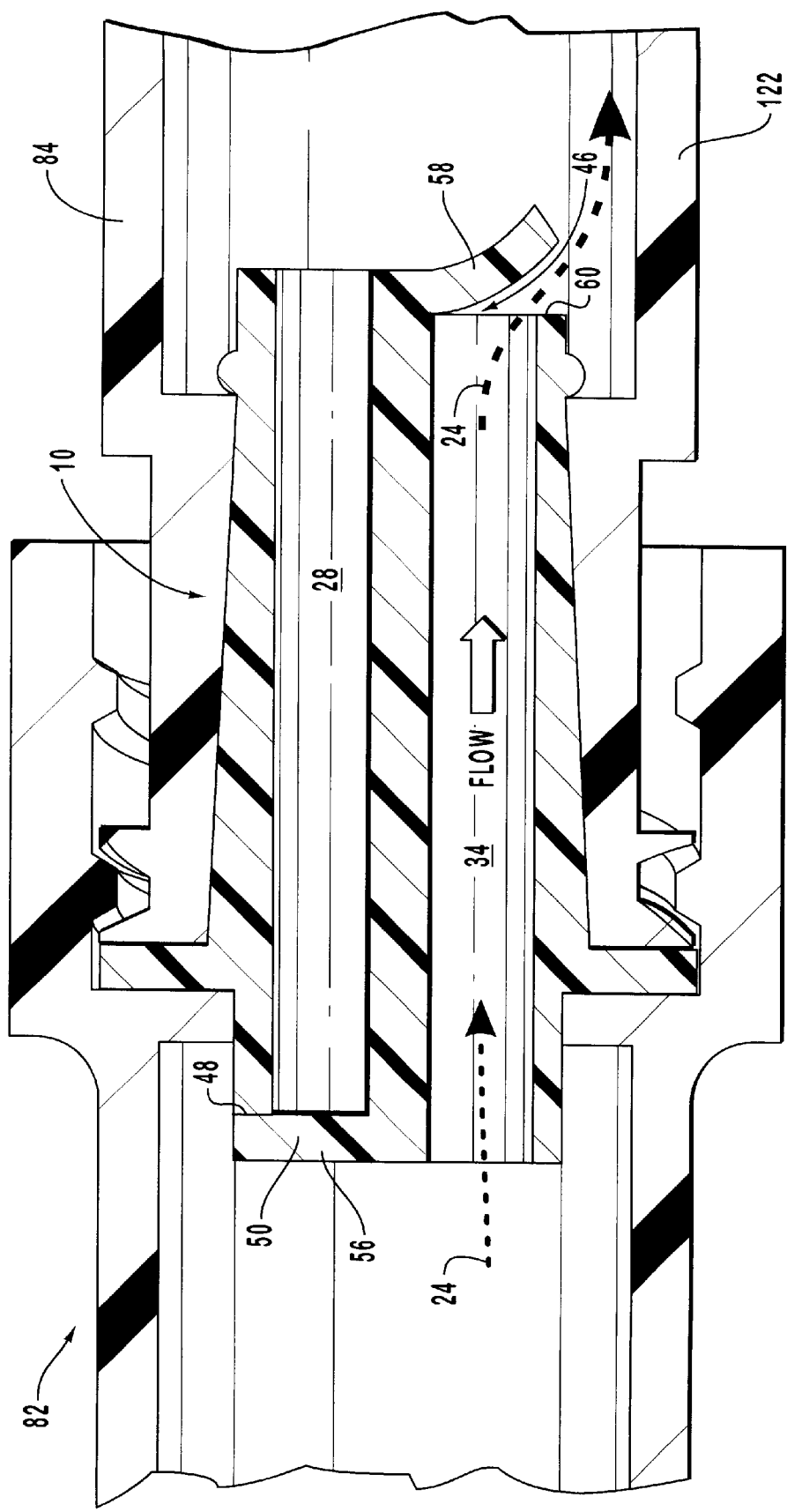
FIG. 6 is a view as in FIG. 5 in which the material flows through a second flow path while the first flow path is closed.

With continued reference now to FIG. 6, second flow path 24 is shown. In operation, material delivered from second syringe 82 enters second channel 34 and travels along second flow path 24, exiting at secondary opening 46. As material is delivered along path 24, valve head 58 is opened and unseated from valve seat 60. Flow path 24 extends out of secondary opening 46 past valve head 58 in an outward manner, i.e., toward the wall 122 of barrel 104. In the embodiment of FIG. 6, material flows from second syringe 82. Thus, first valve head 50, e.g., member 56 is pressed against first valve seat 48, sealing secondary opening 42 of first channel 28.

A schematic representation of the first and second flow paths 22, 24 achieved when plungers in first and second barrels 84, 104 are alternately compressed or actuated is shown in FIGS. 5 and 6. Material flowing through adaptor 10 is expressed through secondary openings 42, 46 in an outward direction, i.e., toward the walls 120, 122 of respective barrels 104, 84, aiding in circulation of material. Consequently, the exit pattern of path 22 is substantially remote from the entrance pattern of path 24, and vice versa, thereby providing for a circulating, mixing motion. Adaptor 10 thus enables the circulation of material between syringe barrels in a substantially circular flow pattern, as opposed to movement of material back and forth between tips.

Figure 7:
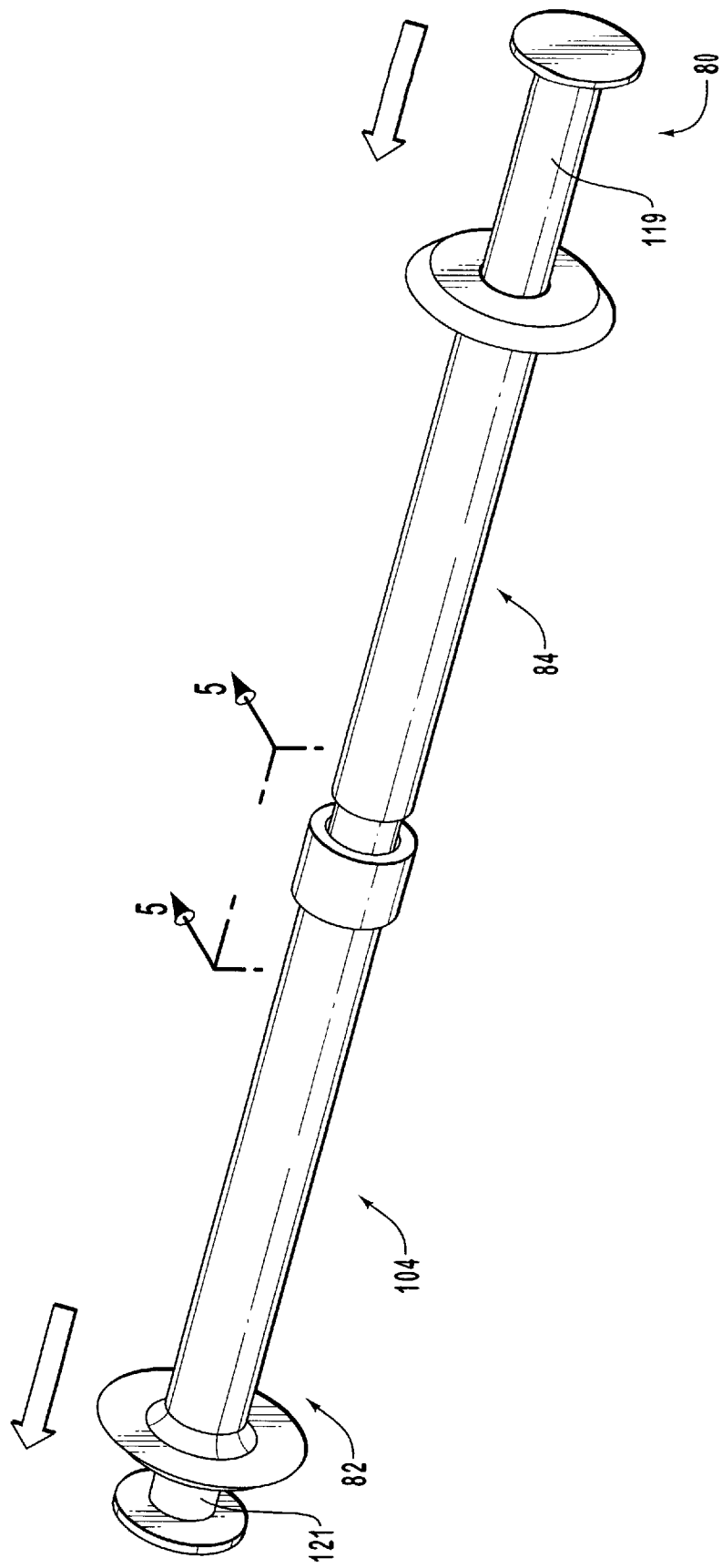
FIG. 7 is an assembled perspective view of the adaptor of FIGS. 1 and 2 and the barrels of FIGS. 3 and 4, and plungers slidably mounted in respective barrels.

A depiction of the mixing action enabled by the present invention is shown in FIG. 7. Barrel 84 is shown as coupled to barrel 104 with adaptor 10 therebetween. Upon compressing a first plunger 119 into material-filled barrel 84 in the direction of the arrows, second plunger 121 is forced outwardly from barrel 104. Upon then compressing plunger 121 into material-filled barrel 104, plunger 119 is forced outwardly from barrel 84. This cycle is continued until the materials in both barrels are mixed. This back and forth, alternating, compressing motion efficiently mixes materials disposed in barrels 84 and 104.

First syringe 80 of FIG. 7 is an example of a first delivery means for delivering material, while second syringe 82 of FIG. 7 is an example of second delivery means for delivering material. Additional examples of delivery means for delivering material which can be used in conjunction with adaptor 10 include other syringes, pumps, reservoirs, squeeze bottles, fluid bags, pressurized tanks, and other containers.

A variety of different materials may be mixed through the use of adaptor 10, including liquids and powders and other compositions, such as A/B type compositions used in medicine and dentistry. Examples of A–B type materials which may be mixed within adaptor 10 include epoxies, luting agents, powder-liquid combinations, powder14 powder combinations, liquid-liquid combinations, two-part bleaching materials, and a variety of other materials known in the art or yet to be produced.

Adaptor 10 may be comprised of a variety of different materials, although a material is preferred which is flexible enough that valve heads 50, 58 can selectively open when pressure is applied on the interior surface thereof, yet close when pressure is applied on the exterior surfaces thereof. Examples of such materials which may be useful in the present invention include polyethylene, polypropylene, neoprene, santaprene, an olefin, such as J-VON, or another thermoplastic elastomer. The materials used in the adaptor are preferably injection-molded. However, a variety of different materials and manufacturing methods can be employed, such as thermoset materials.

In another embodiment (not shown), rather than being selectively coupled to one or more delivery means, an adaptor of the present invention is permanently coupled to one or more delivery means.

Figure 8:
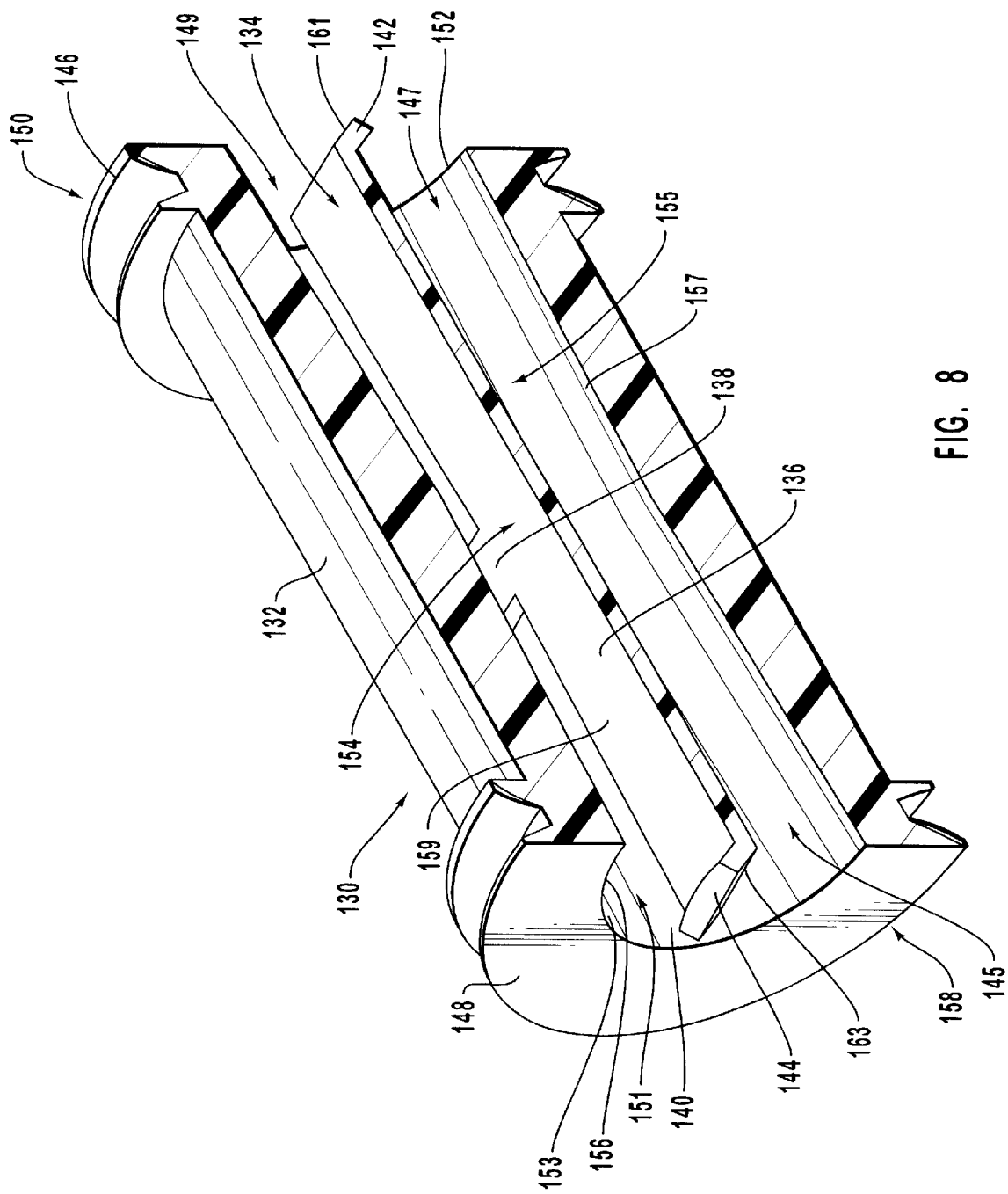
FIG. 8 is a cross sectional view of an alternate adaptor of the present invention having a moving septum.

FIG. 8 is a cross sectional view of yet another embodiment of an adaptor 130 of the present invention. Adaptor 130 features a hollow, substantially cylindrical main body 132 and a substantially flexible septum 134 configured to move between a first position and a second position depending upon the direction of flow of material flowing through main body 132.

Septum 134 comprises (i) an elongate member 136; (ii) first and second side tabs 138; and (iii) first and second angled tabs 142, 144. Elongate member 136 is coupled to an interior surface 140 of main body 132 through the use of first and second opposing side tabs 138 extending from elongate member 136 and coupled to interior surface 140. Only one side tab 138 is shown in the cross sectional view of FIG. 8. An opposing side tab extends from an opposite side of member 136 from tab 138 into the interior surface of body 132. In one embodiment, hingable movement of septum 134 is encouraged by reducing the mass of side tabs 138.

Also extending from member 136 are first and second angled tabs 142, 144. Angled tabs 142, 144 are provided in order to guide material in a desired direction as material flows past septum 134 and to guide the ends of septum into desired positions. Adaptor 130 further comprises threads 146, 148 which extend from the main body 132 of adaptor 130 at opposing ends thereof In light of the substantially flexible, alternating nature of septum 134, as material is pushed into first end 150 of adaptor 130, tab 142 is pressed towards a wall portion 152 of main body 132 and material flows through a primary opening 149 past septum 134 on a first side 154 of septum 134 and exits a secondary opening 151 at second end 158 adjacent opposing wall portion 156 of main body 132. Naturally, the size of primary opening 149 increases as tab 142 is pressed towards wall portion 152.

Conversely, when material is forced through second end 158, tab 144 is pressed toward wall portion 156 and material flows through a primary opening 145 and is allowed to flow through main body 132 and exits from a secondary opening 147 at first end 150. Naturally, the size of primary opening 145 increases as tab 144 is pressed towards wall portion 152.

In the embodiment of FIG. 8, a first channel is defined, or at least partially defined, by one side 154 of septum 134 and a first portion 153 of the interior surface 140 of adaptor 130. An opposing second channel is defined, or at least partially defined, by an opposing side 155 of septum 134 and a second portion 157 of the interior surface 140 of adaptor 130. The first and second channels define respective flow paths. Material flows through the first channel when flowing through first end 150 and exiting from second end 158. Material flows through the second channel when flowing through second end 158 and exiting from first end 150.

Septum 134 is thus another example of dividing means for dividing main body 132 such that there is a first channel within main body 132, and a second channel within main body 132. Adaptor 130 provides a bidirectional flow pattern as discussed above with respect to adaptor 10.

Septum 134 moves between a first position in which tab 142 is disposed toward or against wall portion 152 and a second position in which tab 144 is disposed toward or against wall portion 156. Upon alternately actuating syringes or other delivery means coupled to opposing sides of adaptor 130, a substantially circular flow pattern is achieved.

Consequently, in the present invention, the septum which provides the bidirectional flow and substantially circular flow pattern of material can either be substantially nonmovably affixed as discussed with respect to adaptor 10, or can move between first and second positions as shown with respect to adaptor 130.

The opposing edges 159 (only one edge 159 shown) of elongate member 136 adjacent interior surface 140 can be positioned close to interior surface 140 and configured to correspond with the shape of the interior surface 140 (or the internal portion of a barrel coupled to the adaptor) so as to prevent or at least minimize the flow of material past the edges 159 of elongate member 136, such that the flow paths defined by the first and second channels are substantially distinct. In addition, in one embodiment, the exterior edges of tabs 142, 144 are configured to correspond with the shape of respective wall portions.

Tab 142 is an example of a valve head, while wall portion 152 is an example of a valve seat. Tab 144 is another example of a valve head, while wall portion 156 is another example of a valve seat. Each of the valve heads can be configured to seal against respective wall portions upon influx of material against the exterior portions 161, 163 thereof, yet open upon the influx of material against the interior portions thereof.

Figure 9:
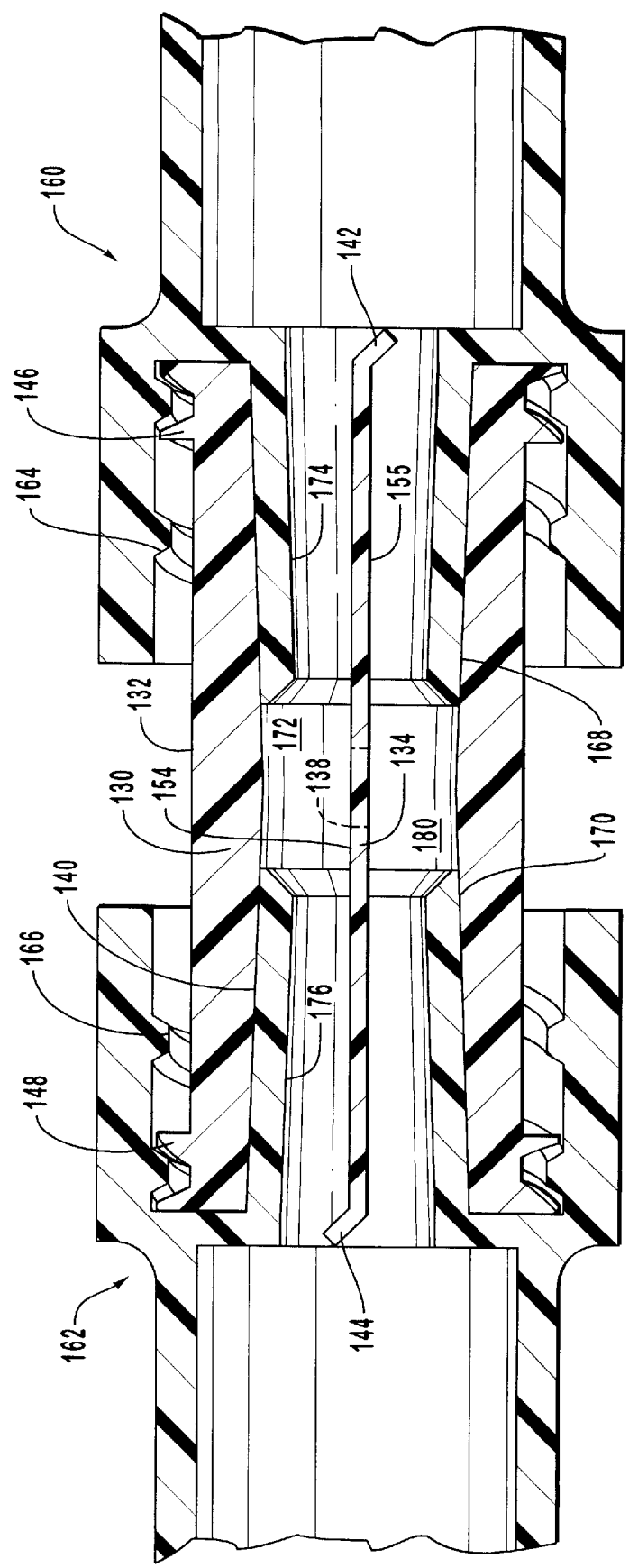
FIG. 9 is a cross sectional view of a system of the present invention comprising the adaptor of FIG. 8 and first and second syringe barrels coupled to the adaptor.
Figure 13:
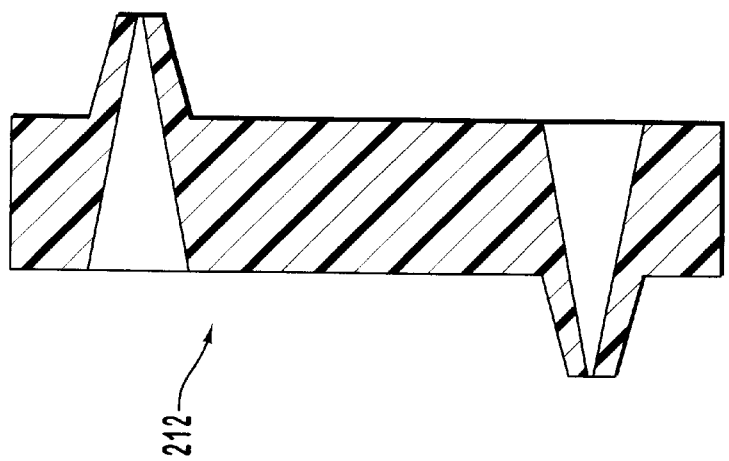
FIG. 13 is a cross sectional view of the adaptor of FIG. 12.
Figure 12:
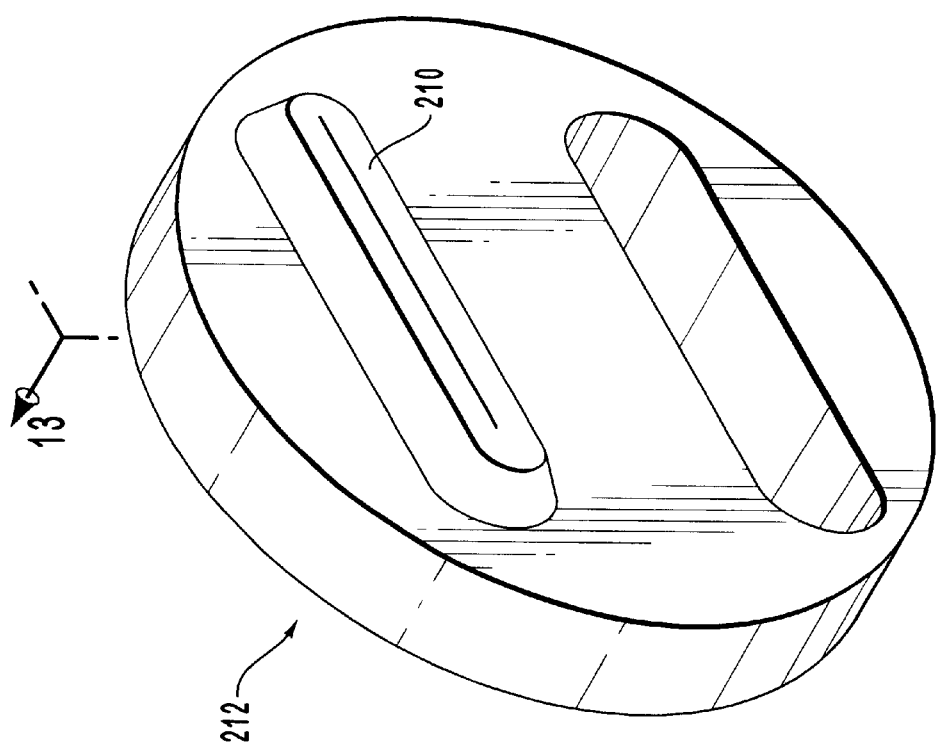
FIG. 12 is a perspective view of another adaptor of the present invention.

With reference now to FIG. 9, adaptor 130 is shown as being disposed between first and second syringe barrels 160, 162 such that material can be transferred between first and second syringe barrels 160, 162. Threads 164, 166 of respective barrels 160, 162 couple with the threads 146, 148 of adaptor 130.

As shown, interior surface 140 of main body 132 of adaptor 130, is tapered on opposing ends thereof so as to mate with the male portions 168, 170 of respective opposing syringe barrels 160, 162. As the tapered male portions 168, 170 are mated within the interior portion 140 of adaptor 130, i.e., by threading threads 164, 166 onto respective threads 146, 148 adaptor 130 is held in a tight-fitting relationship between syringe barrels 160, 162. Also as shown, septum 134 is positioned within main body 132 of adaptor 130 and is configured to flex into a desired position upon the influx of pressurized material from one end or another.

In the assembled embodiment of FIG. 9, first channel 172 for receiving material therethrough is defined by a first side 154 of septum 134, a first portion of interior surface 140 of adaptor 130 and first portions of the interior surfaces 174, 176 of respective syringe barrels 160, 162. Second channel 180 for receiving material therethrough is defined by a second side 155 of septum 134, a second portion of the interior surface 140 of adaptor 130 and second portions of the interior surfaces 174, 176 of respective syringe barrels 160, 162.

Adaptor 130 may be comprised of a variety of different materials, although a material is preferred which is flexible enough that septum 134 can be selectively positioned in a desired orientation. Examples of such materials which may be useful in the present invention include polyethylene, polypropylene, neoprene, santaprene, an olefin, such as J-VON, or another thermoplastic elastomer. The materials used in the In the embodiment of FIGS. 8 and 9, elongate member 136 of septum 134 is substantially parallel to the longitudinal axis of main body 132 and tabs 142, 144 can seal against interior surface 140 when material flows against the exterior surfaces 161, 163 thereof, yet open when material flows against the opposing interior surfaces thereof.

In yet another embodiment (not shown), a substantially flexible elongate member of a septum is positioned at an angle with respect to the longitudinal axis of main body 132. In one such embodiment, the elongate member is at an angle which is oblique to the longitudinal axis of the body. Also in one such angled embodiment, the elongate member is substantially straight at the ends thereof, rather than having angled end tabs such as tabs 142, 144. In such an embodiment, the substantially straight ends of the elongate member can be configured to be against or adjacent the interior surface of the main body, such that material is directed to a first or second channel formed within the angle between an end of the elongate member and an interior surface of the main body, causing the end of the elongate member to flex open when the interior surface of the member is contacted. The material is thus encouraged to flow in a particular channel by the inclination of the elongate member. Also in this embodiment, the side tabs of the elongate member (similar to tabs 138, for example) can feature a reduced mass to encourage hingable movement of the member. Thus, material can be encouraged to flow in a particular desired channel through the use of angled tabs, an inclined septum, and/or through the use of a hinge, such as side tabs having a reduced mass.

Alternative adaptors of the present invention are also featured in FIGS. 10–11, 12–13, 14 and 15. Each of these adaptors comprises a main body substantially in the shape of a disk, the main body having a hollow interior surface and dividing means for dividing the main body such that there is (i) a first channel within the main body; and (ii) a second channel within the main body, thereby creating a substantially circular flow pattern. Each of these adaptors is configured for enabling a material to be transferred from a first delivery means to a second delivery means and for enabling another material to be transferred from a second delivery means to a first delivery means.

FIGS. 10–11 feature an adaptor 182 configured to be coupled between first and second delivery means, such as syringes. Adaptor 182 has a septum 184 within a hollow main body 186. A first side 188 of septum 184 and a first portion 190 of the interior surface of body 186 define a first channel which has primary and secondary openings and which defines a first flow path. A second side 192 of septum 184 and a second portion 194 of the interior surface of body 186 define a second channel which has primary and secondary openings and which defines a second flow path.

As another example of first and second valve means, first and second substantially flexible valve heads 196, 198 extend from septum 184 and seal against respective first and second valve seats 200, 202 when material flows against respective exterior surfaces 204, 205 thereof, but open when material flows against interior surfaces 206, 207 thereof. The first and second valve means may be shaped as substantially semicircular extensions 208, as shown in FIG. 10, but may also be shaped as a substantially rectangular extensions 210, as shown in adaptor 212 of FIG. 12.

Figure 15:
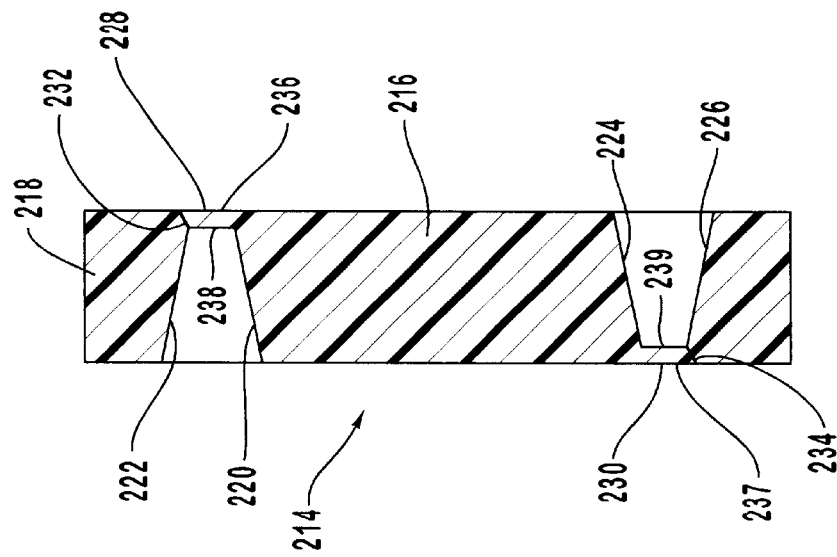
FIG. 15 is a cross sectional view of the adaptor of FIG. 14.
Figure 14:
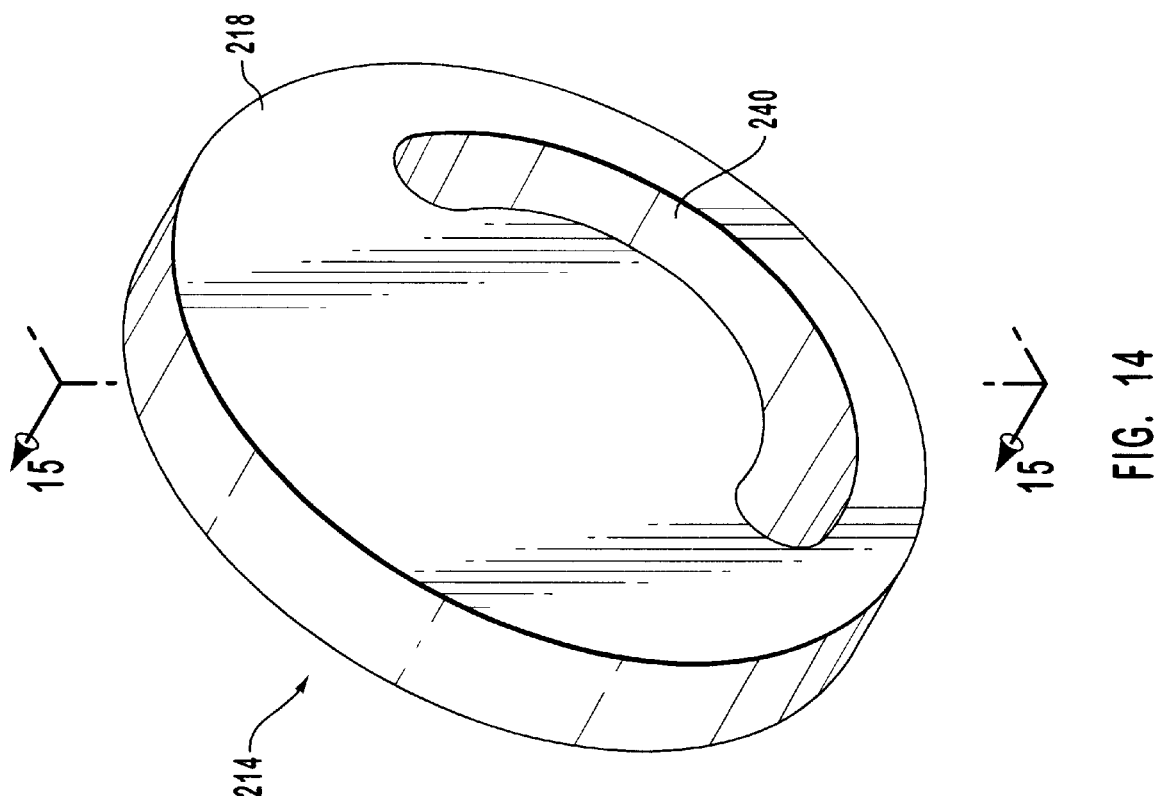
FIG. 14 is a perspective view of another adaptor of the present invention.

FIGS. 14–15 feature an adaptor 214 configured to be coupled between first and second delivery means, such as syringes. Adaptor 214 has a septum 216 within a hollow main body 218. A first side 220 of septum 216 and a first portion 222 of the interior surface of body 218 define a first channel which has primary and secondary openings and which defines a first flow path. A second side 224 of septum 216 and a second portion 226 of the interior surface of body 218 define a second channel which has primary and secondary openings and which defines a second flow path.

Figure 17:
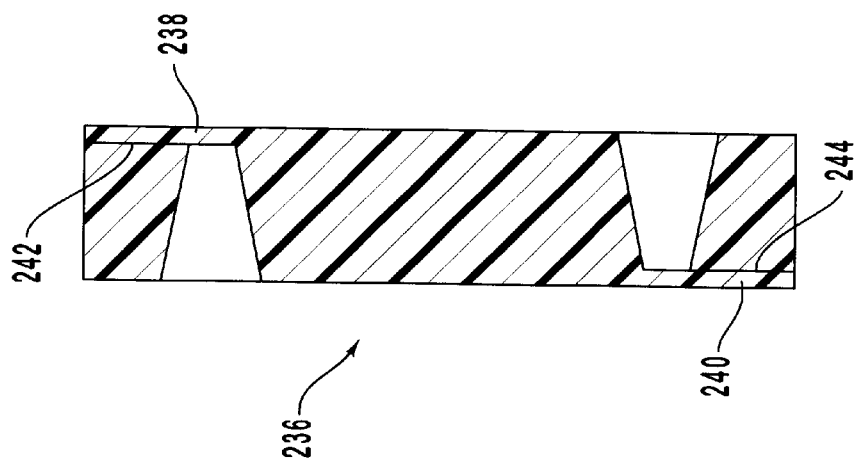
FIG. 17 is a cross sectional view of the adaptor of FIG. 16.
Figure 16:
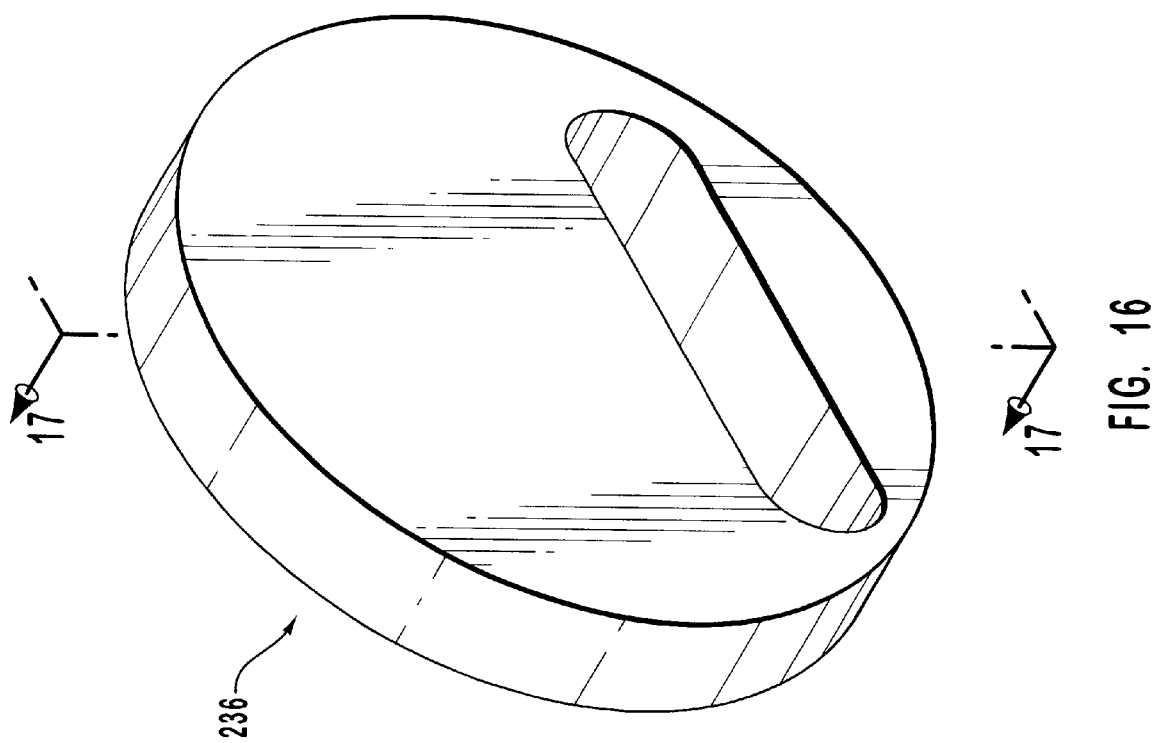
FIG. 16 is a perspective view of another adaptor of the present invention.

As another example of first and second valve means, first and second substantially flexible valve heads 228, 230 extend from septum 216 and seal against respective first and second valve seats 232, 234 when material flows against respective exterior surfaces 236, 237 thereof, but open when material flows against respective interior surfaces 238, 239 thereof. The first and second valve means shown in FIG. 15 may be formed as angled slits through main body 218. The first and second channels may be shaped as substantially semicircular grooves 240, but may also be shaped as substantially rectangular grooves. Adaptor 236 of FIGS. 16 and 17 employs vertical slits to form substantially flexible valve heads 238, 240 and respective valve seats 242, 244. A variety of other slits and valve means may be employed in the present invention. All of the adaptors disclosed herein are examples of adaptor means for enabling material to be transferred from a first syringe to a second syringe.

As discussed below, testing has demonstrated the significant advantage of the bidirectional adaptors of the present invention.

TEST 1

Mixing Employing Linear Pathway Syringes

In a test of first and second linear pathway syringes coupled directly to each other, 125 mixing cycles were required to mix the materials within the syringes. In the test, 0.67 cc of a yellow glycerin composition was delivered into a first 1.2 cc syringe and 0.67 cc of a blue glycerin composition was delivered into a second 1.2 cc syringe. The first and second syringes were coupled in fluid communication, forming a single linear pathway extending between the syringes.

The plunger of the first syringe was then compressed, after which the plunger of the second syringe was compressed, representing one mixing cycle. During the initial mixing cycles, striations of blue, yellow and green highlighted the combined syringes. Ultimately, 125 mixing cycles, representing 250 overall plunger compressions, were required to produce a completely green composition without any blue or yellow striations.

TEST 2

Mixing Employing Bidirectional Adaptor

In a test of first and second syringes and a bidirectional adaptor built in accordance with the system of FIGS. 1–7, only 40 mixing cycles were required to mix the materials within the syringes. In the test, 0.67 cc of a yellow glycerin composition having the same properties as the yellow glycerin composition employed in Test 1 above was delivered into a first 1.2 cc syringe configured in accordance with syringe 80 of FIG. 3. Also, 0.67 cc of a blue glycerin composition having the same properties as the blue composition employed in Test 1 above was delivered into a second 1.2 cc syringe configured in accordance with syringe 82 of FIG. 4. The first and second syringes were coupled in fluid communication with an adaptor configured in accordance with adaptor 10 in a fashion according to the depictions of FIGS. 5–7.

The plunger of the first syringe was then compressed, after which the plunger of the second syringe was compressed, representing one mixing cycle. During the initial mixing cycles, striations of blue, yellow and green highlighted the combined syringes. Ultimately, 40 mixing cycles, representing 80 overall plunger compressions, were required to produce a completely green composition without any blue or yellow striations.

Test 2, which mixed the same materials in the same amounts as those of Test 1, performed the desired mixing in less than one-third the time. Thus, the adaptor and system of the present invention is a significant improvement and contribution to the art.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A system for mixing materials, comprising:
   first delivery means for delivering material, the first delivery means having a hollow tip;
   second delivery means for delivering material, the second delivery means having a hollow tip; and
   adaptor means for enabling material to be transferred from the first delivery means to the second delivery means, wherein a portion of the adaptor is configured to be coupled to the first delivery means and wherein the second delivery means is configured to be coupled to the first delivery means such that material is able to be transferred from the first delivery means to the second delivery means, wherein the tip of the second delivery means is configured to be coupled directly to the tip of the first delivery means.

2. A system for mixing materials, comprising:
   first delivery means for delivering material, the first delivery means having a hollow tip;
   second delivery means for delivering material, the second delivery means having a hollow tip; and
   adaptor means for enabling material to be transferred from the first delivery means to the second delivery means, wherein a portion of the adaptor is configured to be coupled to the first delivery means and wherein the second delivery means is configured to be coupled to the first delivery means such that material is able to be transferred from the first delivery means to the second delivery means, wherein a portion of the adaptor is configured to be received within the tip of the first delivery means and wherein the tip of the first delivery means is configured to be received within the tip of the second delivery means.

3. A system as recited in claim 2, wherein an opposing portion of the adaptor is received within the tip of the second delivery means.

4. A system as recited in claim 2 or 3, wherein the adaptor comprises a hollow main body and a septum positioned within an interior surface of the main body so as to define first and second channels within the main body.

5. A system for mixing materials, comprising:
   a first syringe barrel, said first syringe barrel having a hollow main body and a hollow tip, the hollow main body being coupled in fluid communication with the hollow tip;

a second syringe barrel, said syringe barrel having a hollow main body and a hollow tip, the hollow main body being coupled in fluid communication with the hollow tip; and an adaptor for enabling material to be transferred from said first syringe barrel to said second syringe barrel, wherein a portion of the adaptor is coupled to said first syringe barrel and wherein said second syringe barrel is configured to be coupled to said first syringe barrel such that material is able to be transferred from said first syringe barrel to said second syringe barrel, wherein the tip of said second syringe barrel is configured to be coupled directly to the tip of the first syringe barrel.

6. A system for mixing materials, comprising:

a first syringe barrel, said first syringe barrel having a hollow main body and a hollow tip, the hollow main body being coupled in fluid communication with the hollow tip;

a second syringe barrel, said syringe barrel having a hollow main body and a hollow tip, the hollow main body being coupled in fluid communication with the hollow tip; and an adaptor for enabling material to be transferred from said first syringe barrel to said second syringe barrel, wherein a portion of the adaptor is coupled to said first syringe barrel and wherein said second syringe barrel is configured to be coupled to said first syringe barrel such that material is able to be transferred from said first syringe barrel to said second syringe barrel, wherein a portion of the adaptor is configured to be received within the tip of said first syringe barrel and wherein the tip of said first syringe barrel is configured to be received within the tip of the second syringe barrel.

7. A system as recited in claim 6, wherein an opposing portion of the adaptor is received within the tip of said second syringe barrel.

8. A system as recited in claim 5 or 6, wherein the adaptor comprises a hollow main body and a septum positioned within an interior surface of the main body so as to define first and second channels within the main body.

9. A system for mixing materials, comprising:

a first syringe barrel, said first syringe barrel having a hollow main body and a hollow tip, the hollow main body being coupled in fluid communication with the hollow tip;

a second syringe barrel, said syringe barrel having a hollow main body and a hollow tip, the hollow main body being coupled in fluid communication with the hollow tip; and an adaptor having a hollow main body that enables material to be transferred from said first syringe barrel to said second syringe barrel, wherein the adaptor has a first end opposite from a second end, wherein a portion of the adaptor is coupled to said first syringe barrel, wherein a rounded tip protrudes annularly about the first end of said adaptor so as to securely couple said adaptor with said first syringe barrel, wherein said second end of said adaptor is configured to be engaged by the second syringe barrel, and wherein said second syringe barrel is configured to be coupled to said first syringe barrel such that material is able to be transferred from said first syringe barrel to the second syringe barrel.

10. A system as recited in claim 9, wherein said second syringe barrel is coupled to said first syringe barrel with the tip of said first syringe barrel and the tip of said second syringe barrel being in a mated configuration.

11. A system as recited in claim 9, wherein said second syringe barrel is coupled to said first syringe barrel in a mated configuration with the tip of said first syringe barrel being held within the tip of said second syringe barrel.

12. A system as recited in claim 11, wherein said second end of said adaptor is received within the tip of said second syringe barrel.

13. A system as recited in claim 9, wherein the adaptor comprises a hollow main body and a septum positioned within an interior surface of the main body so as to define first and second channels within the main body.

14. A system as recited in claim 9, wherein said second end of adaptor is coupled to said second syringe barrel, and wherein a circular flange extends annularly around the second end of said adaptor so as to restrain said adaptor from further movement.

15. A system for mixing materials, comprising:

a first syringe barrel, said first syringe barrel having a hollow main body and a hollow tip, the hollow main body coupled in fluid communication with the hollow tip;

a second syringe barrel, said syringe barrel having a hollow main body and a hollow tip, the hollow main body coupled in fluid communication with the hollow tip; and an adaptor having a hollow main body that enables material to be transferred from said first syringe barrel to said second syringe barrel, wherein the adaptor has a first end opposite from a second end, wherein a portion of the adaptor is coupled to said second syringe barrel, wherein a circular flange extends annularly around the second end of said adaptor so as to provide an annular top to engage said second syringe barrel in a manner that restricts movement of said adaptor relative to said second syringe barrel, wherein said first end of said adaptor is configured to be engaged by the first syringe barrel, and wherein said second syringe barrel is configured to be coupled to said first syringe barrel such that material is able to be transferred from said first syringe barrel to said second syringe barrel.

16. A system as recited in claim 15, wherein said second syringe barrel is coupled to said first syringe barrel with the tip of said first syringe barrel and the tip of said second syringe barrel being in a mated configuration.

17. A system as recited in claim 15, wherein said second syringe barrel is coupled to said first syringe barrel in a mated configuration with the tip of said first syringe barrel being held within the tip of said second syringe barrel.

18. A system as recited in claim 15, wherein said second end of said adaptor is received within the tip of said second syringe barrel.

19. A system as recited in claim 15, wherein the adaptor comprises a hollow main body and a septum positioned within an interior surface of the main body so as to define first and second channels within the main body.

20. A system as recited in claim 13, wherein a portion of the adaptor is coupled to said first syringe barrel, wherein a rounded tip protrudes annularly about the first end of said adaptor so as to secure adaptor to said first syringe barrel.

21. A system for mixing materials, comprising:

a first syringe barrel, said first syringe barrel having a hollow main body and a hollow tip, the hollow main body being coupled in fluid communication with the hollow tip;

a second syringe barrel, said syringe barrel having a hollow main body and a hollow tip, the hollow main body being coupled in fluid communication with the hollow tip;

an adaptor coupled in fluid communication between said first syringe barrel and said second syringe barrel, and wherein the adaptor has first and second channels that define two separate flow paths that are distinct from one another;

a first one way valve associated with the first channel and which operates to permit the material to flow in one direction through one of the flow paths from the first syringe barrel to the second syringe barrel; and a second one way valve associated with the second channel and which operates to permit the material to flow in an opposite direction through the other flow path from the second syringe barrel to the first syringe barrel.

22. A system for mixing materials, comprising:

a first syringe barrel, said first syringe barrel having a hollow main body and a hollow tip, the hollow main body being coupled in fluid communication with the hollow tip;

a second syringe barrel, said syringe barrel having a hollow main body and a hollow tip, the hollow main body being coupled in fluid communication with the hollow tip;

adaptor means, coupled in fluid communication between said first and second syringe barrels, for controlling the flow of material back and forth between the first and second syringe barrels for purposes of mixing, and wherein the adaptor means comprises first and second means for defining first and second flow paths that permit the material to flow in one direction when passing from the first syringe barrel through a first flow path to the second syringe barrel, and then in an opposite direction when passing from the second syringe barrel through the second flow path and back to the first syringe barrel.

\* \* \* \* \*

UNITED STATES PATENT AND TRADEMARK OFFICE
CERTIFICATE OF CORRECTION

PATENT NO. : 6,305,413 B1  
DATED : October 23, 2001  
INVENTOR(S) : Dan E. Fischer and Robert Larsen Page 1 of 1

It is certified that error appears in the above-identified patent and that said Letters Patent is hereby corrected as shown below:

<u>Title page,</u>
Terminal Disclaimer filed 05/02/01 is not referenced

<u>Column 2,</u>
Line 44, after "main" change "boy" to -- body --

<u>Column 7,</u>
Line 59, after "combinations," change "powder14 powder" to -- powder-powder --

<u>Column 9,</u>
Line 67, after "used in the" insert -- adaptor are preferably injection-molded. However, a variety of different materials and muanufacturing methods can be employed, such as thermoset materials. --

Signed and Sealed this

Fourteenth Day of May, 2002

*Attest:*

*Attesting Officer*

JAMES E. ROGAN  
*Director of the United States Patent and Trademark Office*